(12) United States Patent
Redmon

(10) Patent No.: US 6,478,964 B1
(45) Date of Patent: Nov. 12, 2002

(54) FLOATING FINE-BUBBLE AERATION SYSTEM

(75) Inventor: David T. Redmon, Racine, WI (US)

(73) Assignee: Midwest Water Management, LLP, North Lake, WI (US)

( * ) Notice: Subject to any disclaimer, the term of this patent is extended or adjusted under 35 U.S.C. 154(b) by 0 days.

(21) Appl. No.: 09/860,339

(22) Filed: May 18, 2001

(51) Int. Cl.[7] .................................................. C02F 3/02
(52) U.S. Cl. .................... 210/620; 210/220; 210/242.2; 261/77; 261/120; 261/122.1; 261/124
(58) Field of Search .................................. 210/620, 170, 210/220, 242.2; 261/77, 120, 121.1, 122.1, 124

(56) References Cited

U.S. PATENT DOCUMENTS

| | | | | |
|---|---|---|---|---|
| 3,235,234 A | * | 2/1966 | Beaudoin | 210/242.2 |
| 3,768,788 A | * | 10/1973 | Candel | 261/122.1 |
| 4,287,062 A | * | 9/1981 | von Nordenskjöld | 210/242.2 |
| 4,288,394 A | * | 9/1981 | Ewing et al. | 210/220 |
| 4,294,696 A | * | 10/1981 | Thayer | 210/220 |
| 4,961,854 A | * | 10/1990 | Wittmann et al. | 210/220 |
| 5,374,353 A | * | 12/1994 | Murphy | 210/620 |
| 6,260,831 B1 | * | 7/2001 | Jäger | 261/122.1 |
| 6,348,147 B1 | * | 2/2002 | Long | 210/220 |

* cited by examiner

Primary Examiner—Christopher Upton
(74) Attorney, Agent, or Firm—Armstrong, Westerman & Hattori, LLP

(57) ABSTRACT

A floating fine-bubble aeration system for dissolving a gas in a liquid in which the system is floated. A grid of uniformly spaced fine-bubble diffusers is used to establish large area of bubble-laden liquid, having a substantially uniform density. The uniform density prevents the formation of any upwardly directed currents within the interior portion of the area. Bubble residence time is maximized, due to the absence of the currents, thus increasing the efficiency of dissolving the gas in the liquid.

28 Claims, 9 Drawing Sheets

FLOATING FINE-BUBBLE AERATION SYSTEM

FIELD OF THE INVENTION

This invention relates to an apparatus for aerating liquids held in a containment structure. More particularly the invention relates to an apparatus for aerating liquids contained in large structures wherein the apparatus is maintained in an operating position by floatation.

BACKGROUND OF THE INVENTION

In the treatment of wastewater, in the conditioning of water for aquatic life, and for various industrial and environmental processes, it is necessary to dissolve oxygen or other gases in a liquid so as to promote bacterial action, provide oxygen for survival of aquatic life, chemically oxidize substances and various other reasons. In processes requiring oxygen, it is well known to compress air, (which contains approximately 21% oxygen) and inject it in bubble form beneath the surface of a liquid so as to dissolve a portion of the oxygen of the air bubbles into the liquid being treated. Factors such as size of the bubbles, bubble residence in the liquid, temperature of the air and liquid, depth of injection, etc. determine the percentage of the oxygen that is dissolved in the liquid prior to the oxygen-containing bubbles reaching the top surface of the liquid. By optimizing various factors a more efficient aerating process can be carried out so as to maximize the oxygen dissolved per unit energy input to the aeration system. The factors contributing most to the efficiency of the system are bubble size and bubble residence in the liquid.

When bubbles are produced from a given quantity of air, the area of gas/liquid interface is greater for small bubbles formed from that quantity of air than for larger bubbles formed from that quantity of air.

Bubble residence time in a liquid is primarily dependent on 1) size of the bubble, and 2) factors other than buoyancy that move a bubble in a vertical direction toward the top surface of the liquid. Regarding vertical movement due to bubble size and buoyancy, the smaller the bubble the slower the vertical movement.

The primary factor in bubble residence, other than buoyancy and its relation to bubble size, is upwardly directed currents in the liquid which add velocity to the bubbles and decreases the time it takes a bubble to reach the top surface of the liquid. The upwardly directed currents can be caused by various conditions, however, a prime cause found with prior art aeration devices is liquid density induced currents. Liquid density induced currents are described with reference to FIGS. 1 and 2. In FIG. 1, the body of liquid 22 has portions 20, having bubbles distributed throughout, and portions 24 which are substantially free of bubbles. Such a condition is found, for example, where concentrated areas of bubble-producing devices such as 26 are spaced apart a relatively large distance (for example 20–40 ft.) in a wastewater treatment pond. When a condition as described exists, portions 20, having bubbles throughout, have a lower density than the surrounding bubble-free portions 24 and upwardly directed currents, indicated by arrows 28, are induced by density gradients.

Another example of the density induced currents is described with reference to FIG. 2. In FIG. 2, reactor tank 30, has bubble-providing devices 32 located solely along two sides of the tank. Rolling currents 34 are induced as a result of the density gradients and they increase the upward vertical velocity of bubbles 36 thus reducing the bubble residence time.

An additional problem found with some prior art aeration devices having bottom support members, experienced especially during installation or maintenance, is the need to drain the containment structure. Such a need can present enormous problems for many installations. The devices of FIGS. 1 and 2 are both bottom mounted.

The apparatus and methods of the present invention overcome those problems and other deficiencies found in prior art aerators.

SUMMARY OF THE INVENTION

The present invention includes a gas distribution network having input and output apertures for receiving a gas and conveying it to output apertures which are in communication with fine-bubble producing devices which receive the gas, form bubbles, and discharge the fine bubbles into the liquid in which the apparatus is submerged. A floatation device is used to maintain the fine-bubble producing devices at a selected depth below the top surface of the liquid absent any vertical support from structural members bearing on the containment structure holding the liquid.

The fine-bubble producing devices, such as membrane disc diffusers or membrane tube diffusers are spaced uniformly to form a two dimensional grid with a spacing which provides a substantially uniform density of bubbles above the grid. Liquid density induced currents are minimized and/or prevented from developing over a large portion of the grid because of the substantially uniform density of bubbles throughout the grid area. A grid size is determined which minimizes the affect of the unavoidable liquid density induced currents found near the periphery of the grid.

Other specific features and contributions of the invention are described in more detail with reference being made to the accompanying drawings.

DETAILED DESCRIPTION OF THE INVENTION

Figure 3:
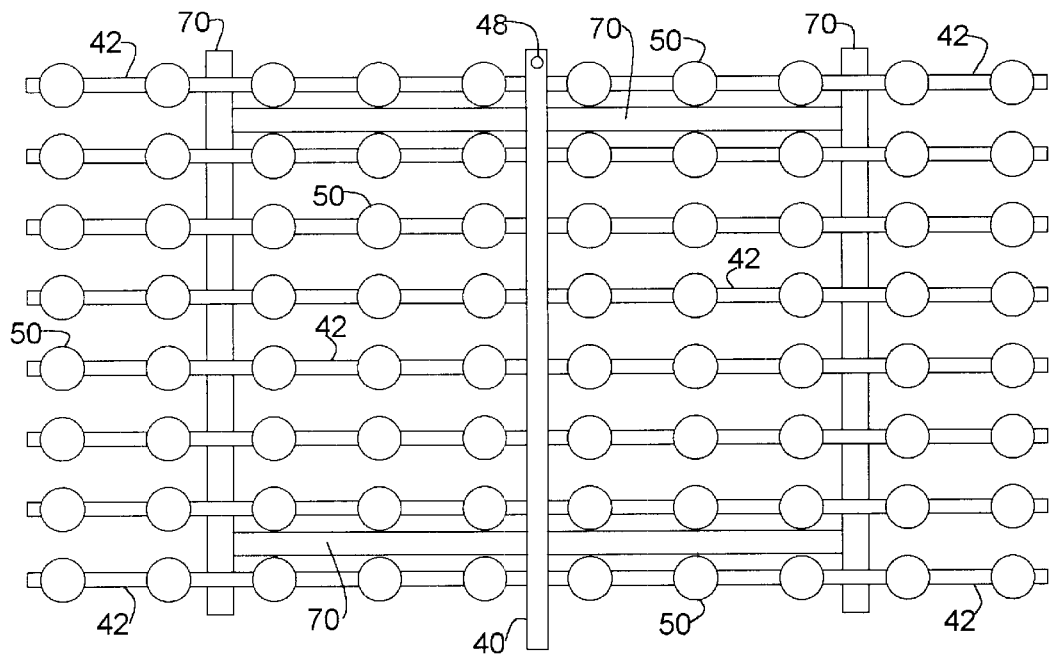
FIG. 3 is a plan view of an aeration apparatus of the invention incorporating a rigid support system for components of the apparatus.
Figure 7:
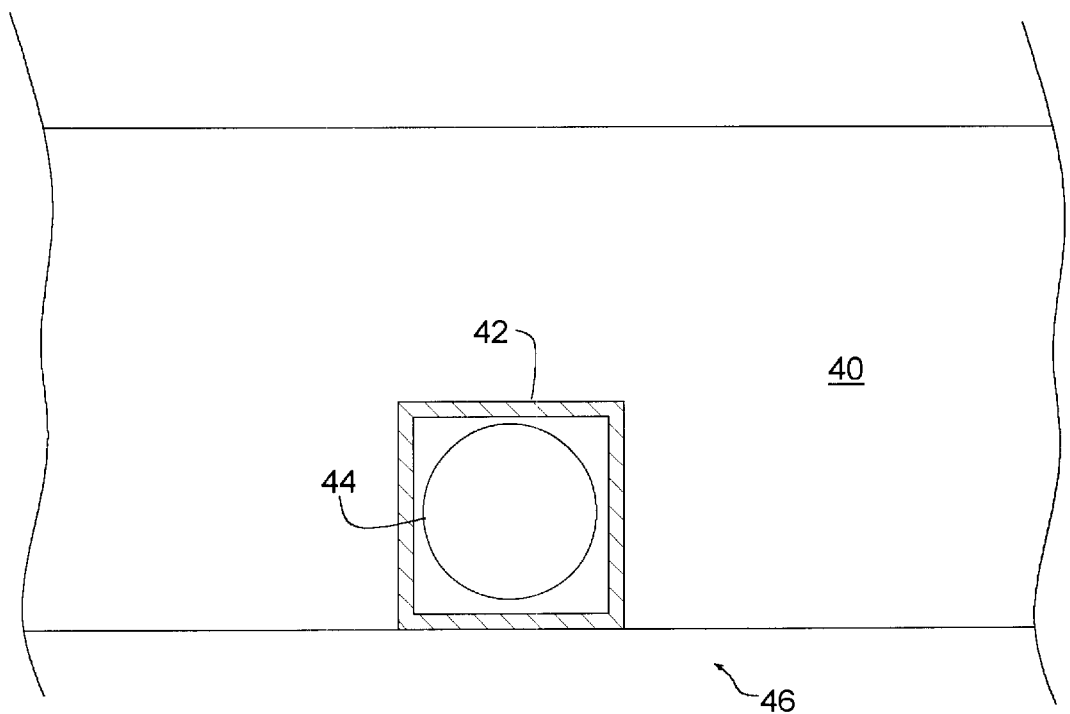
FIG. 7 is a cross-sectional view of the apparatus of the invention taken in a plane indicated at 7—7 of FIG. 4.

FIG. 3 is a plan view of a portion of the preferred embodiment of the apparatus for aerating a liquid. Elongated manifold 40 has a plurality of elongated feeder conduits 42 equally spaced and rigidly attached. The manifold 40 and feeder conduits 42 are preferably fabricated of stainless steel tubing having a rectangular cross-section. However, other types of piping of differing material and differing cross sections can be used. The attachment is preferably made by welding. Referring to FIG. 7, the attachment of each feeder conduit 42 to the manifold 40 is made at a site of an output aperture 44 formed in the manifold 40 by drilling, metal punching, or the like. In order to provide the necessary volume of gas to each of the feeder conduits 42, the manifold 40 is of a larger cross-section than the feeder conduits 42 and it is preferable to align bottoms of the conduits and manifold in the same plane as shown at 46 to facilitate supporting the conduits as discussed below. Although the aperture is shown as being circular in shape other shapes are possible. In the preferred embodiment, the manifold 40 has a nominal dimension of 4"×6", and the feeder conduits 42 have a nominal dimension of 2"×2". The attachment is made to the manifold on the 6" face. Both ends of the manifold and non-attached ends of the conduits are closed. Gas is supplied to the manifold through at least one input aperture as shown at 48 of FIG. 3 which can include a threaded fitting for connecting a gas supply line. Additional input apertures can be provided if required for the volume of air being supplied. In a wastewater treatment pond installation, for example, the gas is supplied from an on-shore compressor via a flexible hose.

Figure 8:
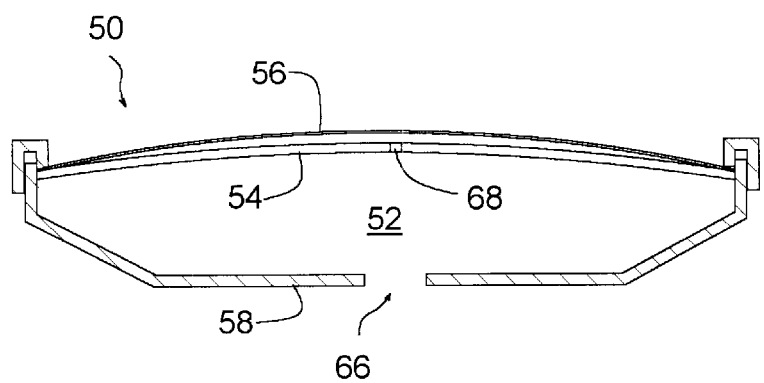
FIG. 8 is a vertical cross-sectional view of a fine-bubble membrane disc diffuser.

A plurality of fine-bubble producing means are attached to each feeder conduit. In FIG. 3, membrane disc diffusers are shown at 50, substantially evenly spaced along conduits 42. FIG. 8 is a vertical cross-section of a membrane disc diffuser 50 showing gas chamber 52, membrane support disc 54, perforated membrane 56, and base 58. Other types of fine-bubble producing means are available such as cylindrically shaped membrane diffusers referred to as membrane tube diffusers. Any fine-bubble diffuser of the membrane type can be used to carry out the invention.

Figure 9:
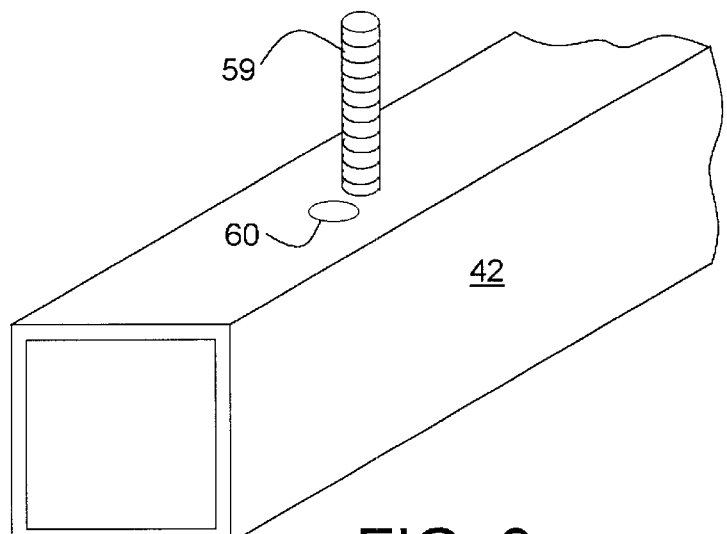
FIG. 9 is a perspective view of a feeder conduit of the invention for describing attachment means for fine-bubble disc diffusers.
Figure 10:
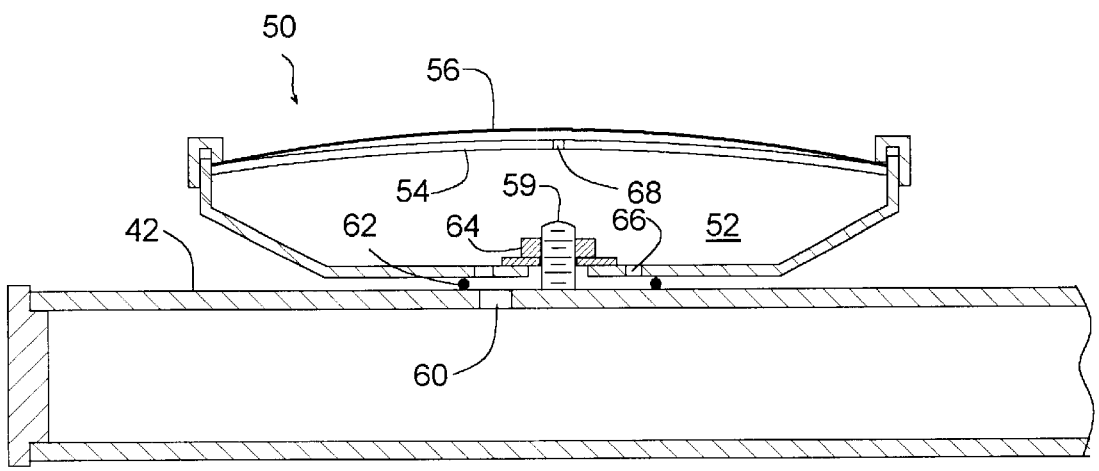
FIG. 10 is a cross-sectional view of the apparatus of the invention taken in a plane indicated at 10—10 of FIG. 4.

FIGS. 9 and 10 show the preferred method for attaching disc diffusers to the conduits. In FIG. 9 a threaded member 59, such as a bolt, is welded or otherwise attached to conduit 42. Near the threaded member, at least one aperture is provided through the wall of the conduit as shown at 60. Referring to FIG. 10, an "O"-ring 62 is placed between diffuser 50 and conduit 42 prior to placing the diffuser over bolt 59. Nut 64 secures the diffuser onto the conduit. In operation, gas from conduit 42 passes through aperture 60, through passages 66 in the diffuser base and into gas chamber 52. The gas then passes through an aperture 68 in support plate 54 to slightly inflate perforated membrane 56. Fine bubbles are formed when the gas passes through the perforations which are very small in cross section. Bubbles 1 mm to 10 mm in diameter are typically formed. Bubbles having a diameter less than 5 mm are preferred. In fabricating the conduits, it is preferred to provide an excess of uniformly spaced threaded members 59 and associated apertures 60 for use if an increase in aeration is required in the future. Plugs for the apertures are easily inserted to prevent the escape of the gas.

Figure 4:
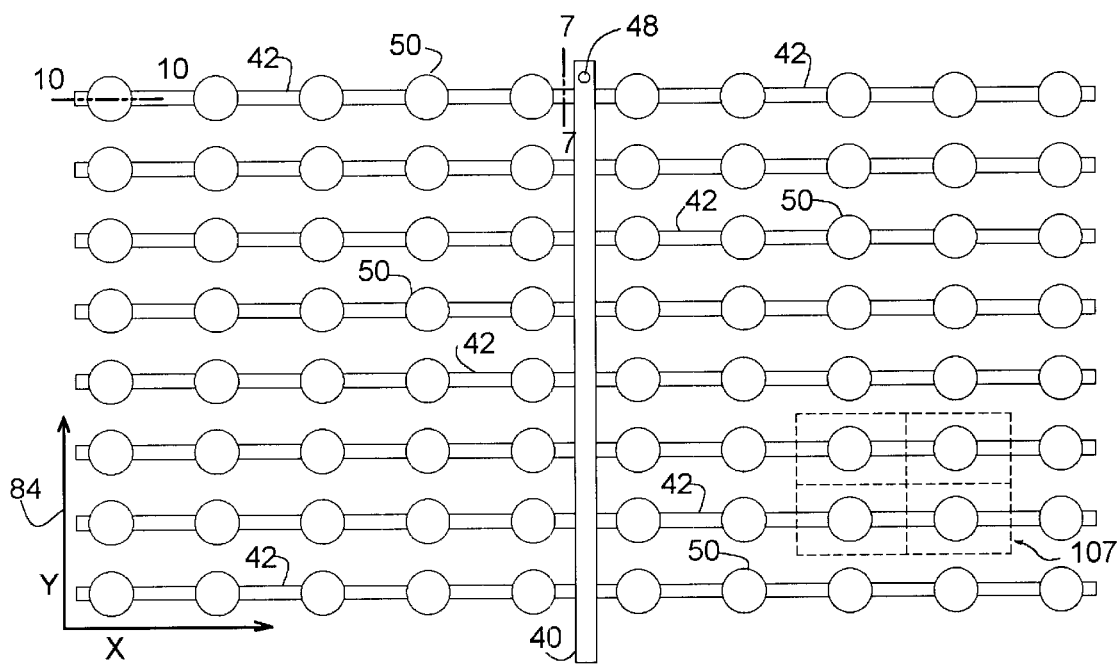
FIG. 4 is a plan view of the aeration apparatus of FIG. 3 shown without the support system.

In order to provide increased rigidity and in some cases additional weight, a frame 70 (FIG. 3) preferably fabricated of "I"-beams is provided below the gas distribution means of the manifold 40 and feeder conduits 42. The rigid frame provides support under the manifold and under the conduits at a point on each conduit toward its non-attached end. Any means for attaching the manifold and conduits to the frame is acceptable. As will be described below, the above described assembly, when in operation, must have a weight greater than the liquid it displaces when submerged in the liquid as it is important that the portion of the apparatus, as depicted in FIG. 3, not float. The selection of manifold, conduit, and frame material and dimensions must be coordinated to achieve that requirement. Although "I"-beams of mild steel are preferred, other materials and shapes can be selected for use in applications where the liquid is highly corrosive or other conditions prevail. FIG. 4 depicts components of the invention, without the frame support, for better clarity in viewing the manifold 40, feeder conduits 42, and diffusers 50.

Figure 5:
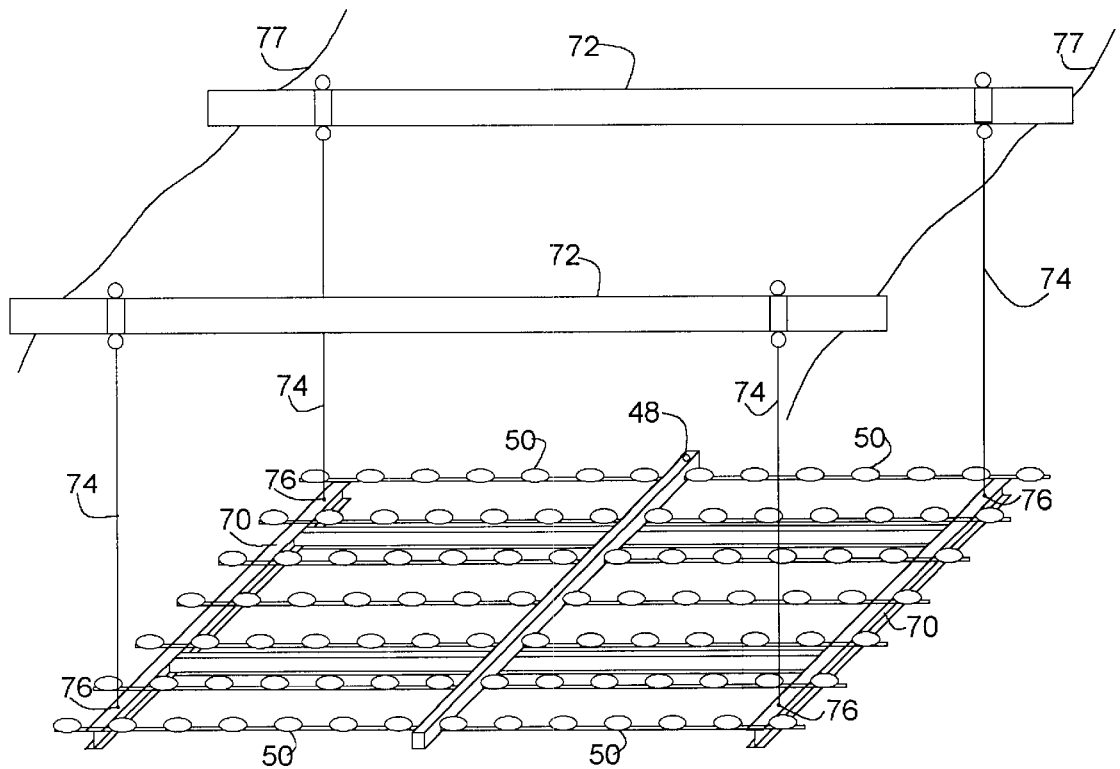
FIG. 5 is a perspective view of an aeration apparatus of the invention shown in floating operating position in liquid of a containment structure.
Figure 6:
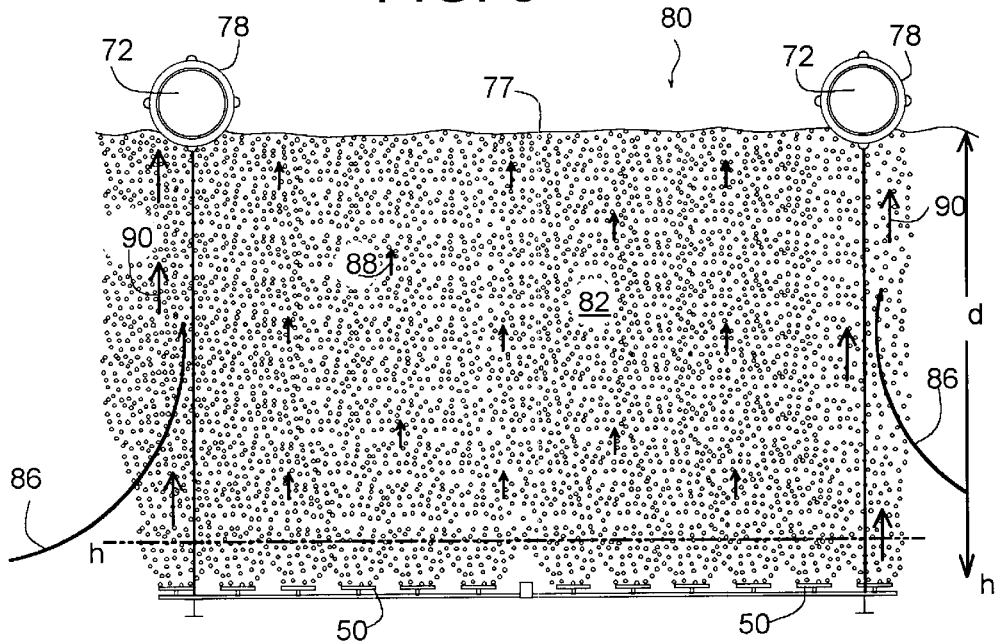
FIG. 6 is an elevational view of an aeration device of the invention for describing liquid density induced currents found at the periphery of a grid of fine-bubble diffusers.

FIG. 5 shows the complete apparatus for aerating liquid as positioned in a liquid when in use. In addition to the assembly shown in FIG. 3, the apparatus includes floatation means for properly positioning the fine-bubble producing diffusers. The floatation means includes buoyant members 72 and cables 74 attached to attachment devices 76 on frame 70. The buoyant members are of any suitable fabrication to provide the buoyancy necessary to maintain the grid of uniformly spaced diffusers 50 at a selected depth below the top surface of the liquid (indicated at 77) in which they are submerged. The diffusers, which substantially lie in a plane, are held parallel to the top surface of the liquid by the floatation means. Although not shown cables can be extended from the floatation mean in a generally horizontal direction to maintain positioning of the apparatus in a wastewater treatment pond or the like. FIG. 6 is an elevational view of the apparatus in working position. Attachment devices 78, which are free to rotate about the floatation device 72 are used to attach cables 74 and can also be used for the horizontal positioning described above.

The primary objective of the present invention is to obtain a high oxygen transfer efficiency; that is oxygen dissolved in a liquid per energy input. Although the description below will focus on oxygen from air being dissolved in a liquid such as wastewater, the system is applicable to other gases being dissolved in other liquids.

A high oxygen transfer efficiency is obtained by providing fine bubbles, thereby providing more gas/liquid interface area, as discussed above, and by promoting a maximum bubble residence time in the liquid.

Figure 1:
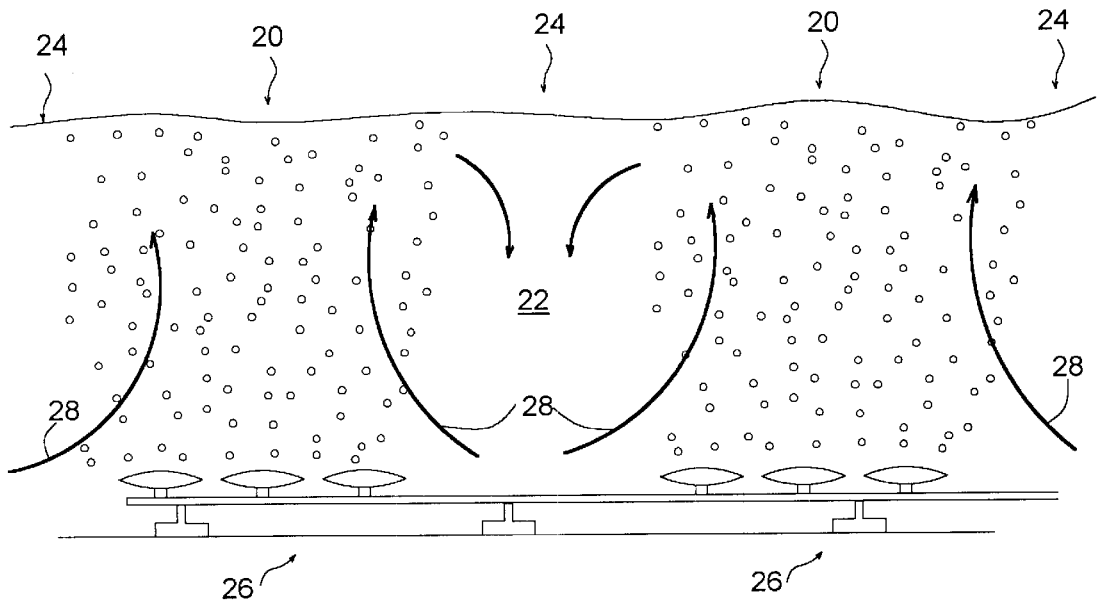
FIG. 1 is an elevational view of a prior art aeration system for describing liquid density induced currents.

The present invention uses fine-bubble diffusers, as discussed, so as to maximize the gas/liquid interface area and to minimize the upward vertical velocity due to buoyancy. The method for increasing residence time is now discussed. The concept of liquid density induced currents in liquids was discussed in relation to FIGS. 1 and 2 wherein, in the prior art practice of locating aeration means at a plurality of locations in a wastewater treatment pond, for example, bubbles discharged from diffusers 26 are propelled to the top surface of the liquid by both buoyancy and the currents, depicted at 28, caused by the difference in liquid densities at 20 and 24. The present invention overcomes most of the influence due to those currents.

The improvement to the oxygen transfer efficiency is obtained by configuring the apparatus such that the bubbles acted on by the induced currents are a small percentage of the total bubbles discharged from the diffusers. That condition is obtained by providing a large field of liquid having substantially the same density in order that only a small portion of the bubbles, that is those at the periphery of the field, are influenced by liquid density induced currents.

Referring to FIG. 6, aerating apparatus 80 has uniformly spaced diffusers 50 positioned a depth d below the top surface 77 of liquid 82 which is being aerated. The diffusers are substantially uniformly spaced in a two dimensional grid as shown in FIG. 4. A 2-dimensional orthogonal coordinate system for referring to spacing in the grid is indicated at 84. Referring again to FIG. 6, with proper spacing in the x-y directions a substantially uniform bubble density, and thus liquid density, can be achieved in a horizontal plane, such as the plane indicated as h-h, beginning at a distance of approximately 2 to 4 feet above the diffusers 50. As depicted in FIG. 6 the discharged bubbles rise from the diffusers initially in a truncated cone shaped pattern so as to form the uniform density area above the entire grid. With a uniform density in the volume of liquid defined horizontally by the plane indicated by h-h and the top surface 77 of the liquid 82, and defined vertically by the four peripheral edges of the grid, there are no significant liquid density gradients within that volume to cause liquid density induced currents. The only portions of the system at which the currents are generated are at boundaries of the grid as depicted by arrows at 86 in FIG. 6. The relative upward vertical velocities of the bubbles are indicated by arrows 88 and 90. The majority of the bubbles have a velocity and direction indicated by arrows 88. A small proportion of the bubbles, at the periphery of the grid, have a greater velocity and direction indicated by larger arrows 90.

The detrimental currents are found at the grid boundary, therefore the percentage of bubbles being influenced by the currents in relation to the total amount of bubbles discharged can be reduced by increasing the size of the grid of diffusers. The relationship of area to edges for a square, having edge "A", for example, is $A^2$ to 4A and it can be seen by substituting numbers of increasing value that the area to edge relationship increases with increasing size. The same type relationship occurs with a rectangular grid configuration. A practical size for a preferred diffuser grid is about 16 feet by 32 feet as the advantages in size are surpassed by practical problems encountered when the size is too large. A minimum size for a rectangular grid is about 12 feet by 12 feet. A size wherein at least 25% of the bubbles discharged are not influenced by density induced currents improves the efficiency significantly. Larger sized grids are preferred so as to increase the percentage of bubbles not influenced.

Figure 11:
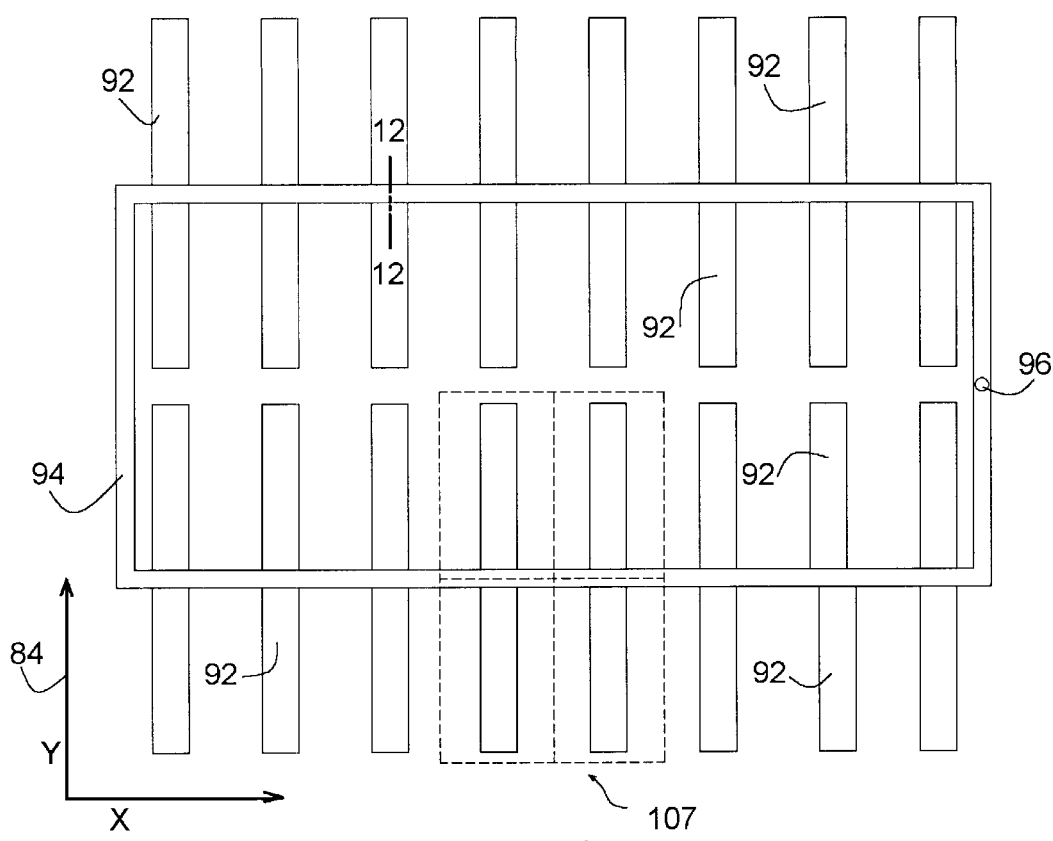
FIG. 11 is a plan view of a second embodiment of the invention wherein cylindrically shaped membrane diffusers are utilized.
Figure 12:
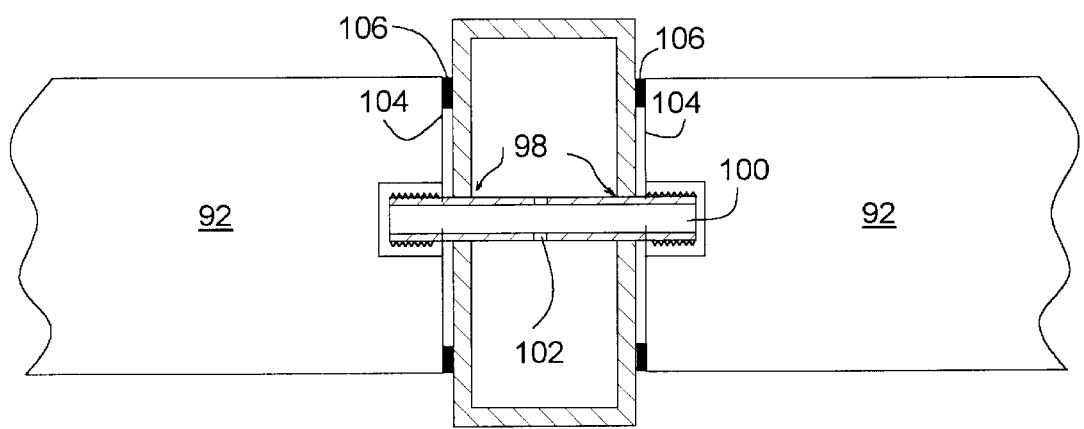
FIG. 12 is a cross-sectional view of the second embodiment of the invention taken in a plane indicated at 12—12 of FIG. 11.

FIG. 11 shows a second embodiment of the apparatus of the invention which is provided with membrane tube diffusers 92 having a cylindrical shape. Diffusers 92 are attached to a rectangular manifold 94, preferably of tubing having a rectangular cross-section, having at least one input aperture 96 for inputting the aerating gas. The diffusers are equally spaced along both sides of the longer legs of the rectangular shaped manifold. Attachment can be made, as shown in FIG. 12 by providing apertures in opposing walls of the manifold as at 98 and passing a threaded nipple 100, into which at least one gas supply aperture 102 has been provided, through the opposing apertures and then threading a membrane tube diffuser 92 onto each threaded end of the nipple. The nipple is of a length so as to position a base 104 of each diffuser against sides of the manifold tubing. A gasket 106 is positioned between each base and manifold. A suitable frame underneath the manifold is provided for rigidity and weight, if needed, and the assembly is suspended in a manner similar to that shown in FIG. 5 with reference to the first embodiment.

In the membrane disc diffuser system of FIG. 4, the membrane tube diffuser system of FIG. 11, or any other system wherein diffusers are uniformly spaced in a grid, a two dimensional array of uniform repeating spacing areas such as 107 of FIGS. 4 and 11 can be described for defining an acceptable "uniform" density of diffusers and thus "uniform" liquid density. For purposes of design, it is convenient to divide the area of the grid into a plurality of uniformly shaped and repeating areas which fill the area of the grid and provide one diffuser per uniformly spaced area. With such a method for describing the uniformity of the system, the shape of the diffusers is not of concern and the definition of "uniform" can be quantified. The ideal shape of the spacing areas is a square. However, it has been determined that an oblong spacing area having side and end measurements with a ratio of up to 4:1 only slightly lowers the efficiency of the system. For systems wherein the diffuser is not square or circular, it is preferable to generally match the shape of the diffuser with the shape of the spacing areas as is shown in FIG. 11 which depicts the cylindrically shaped diffusers in oblong spacing areas. It is preferred that a maximum dimension for a side of a spacing area be 60 inches.

Figure 13:
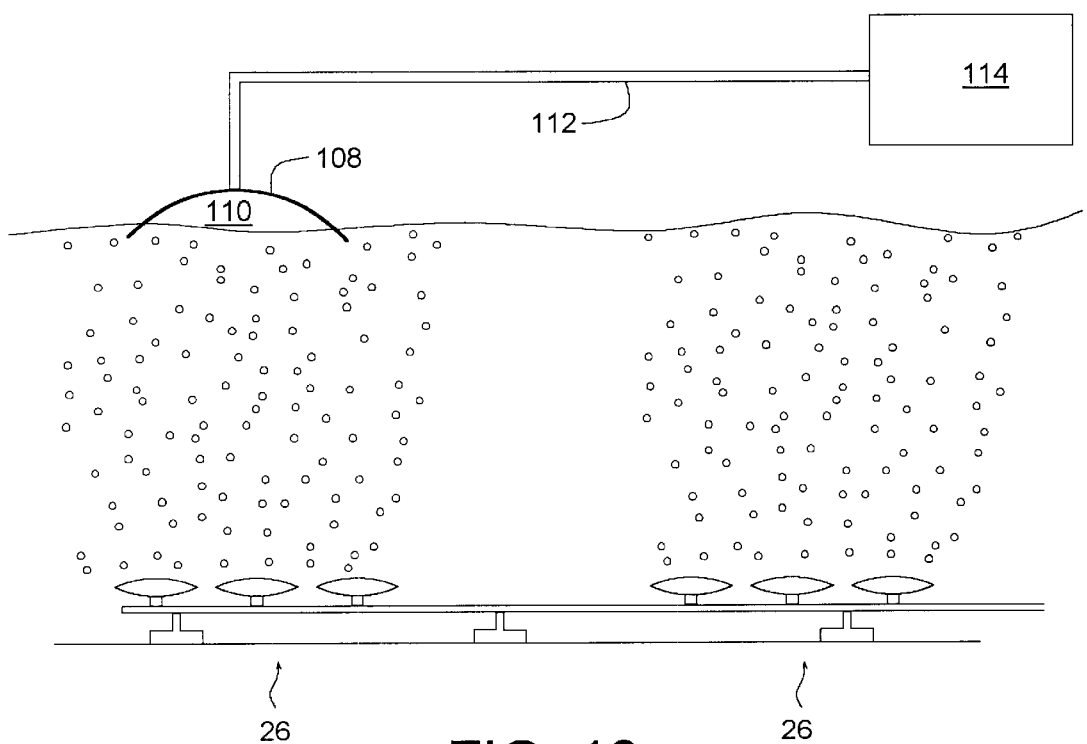
FIG. 13 is an elevational view of apparatus for a method used to determine the efficiency of aeration systems.

The efficiency of oxygen transfer for differing systems can be measured using apparatus depicted in FIG. 13. A collecting hood 108 is placed above the aeration system to be evaluated such that edges of the hood extend into the liquid to form a closed cavity 110. A suction line 112, in communication with cavity 110, conveys the sample offgas, from bubbles which have surfaced, to an oxygen analysis device 114 which analyses the percent oxygen in the captured gas. Knowing the percent oxygen in the gas captured in cavity 110 from the bubbles and the percent oxygen in the compressed air supplied to the manifold, the percent transferred to the liquid can be calculated. To enable comparisons of different systems the above analysis is typically carried out under process water conditions.

An important consideration in the operation of aeration processes in water treatment plants and the like is energy expended per quantity of oxygen dissolved in the liquid. Graphs showing the efficiency of different systems are presented in FIGS. 14 and 15.

Figure 14:
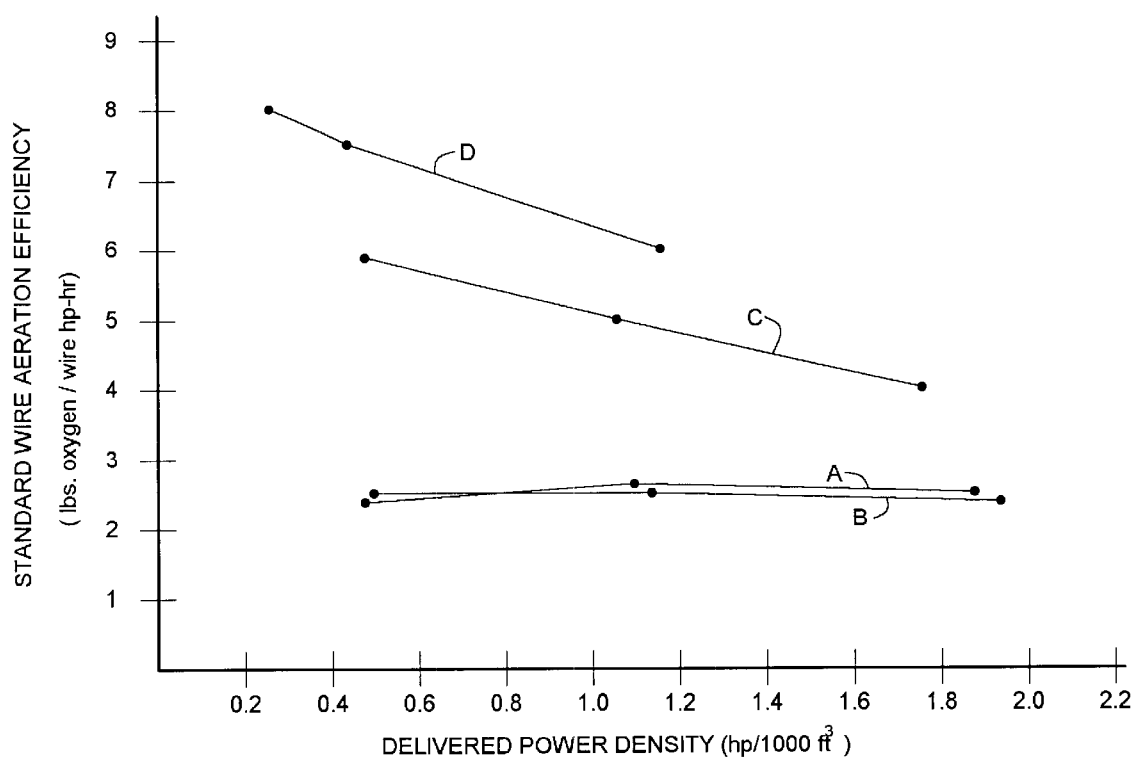
FIG. 14 is a graph showing standard wire aeration efficiency vs delivered power density for various aeration systems.

Data for both of the graphs were obtained in tests conducted in clean water with diffusers located at a depth of 15 feet below the top surface of the water. In FIG. 14, the x axis denotes delivered power density expressed in hp/1000 ft$^3$ of air compressed; the y axis denotes pounds of oxygen dissolved per wire hp-hr (wire hp is the power input to the compressor or the like).

Curve A denotes the efficiency of a coarse bubble aerator wherein the efficiency is strongly decreased because of the relatively low gas/water interface area per given volume of gas and the greater upward velocity that larger bubbles have in comparison with smaller bubbles.

Curve B denotes the efficiency of an aerator wherein a liquid pump and a gas compressor are both used to dissolve the gas in the liquid. The additional energy required for the liquid pump, not require in processes discussed above, decreases the efficiency of that type system.

Figure 2:
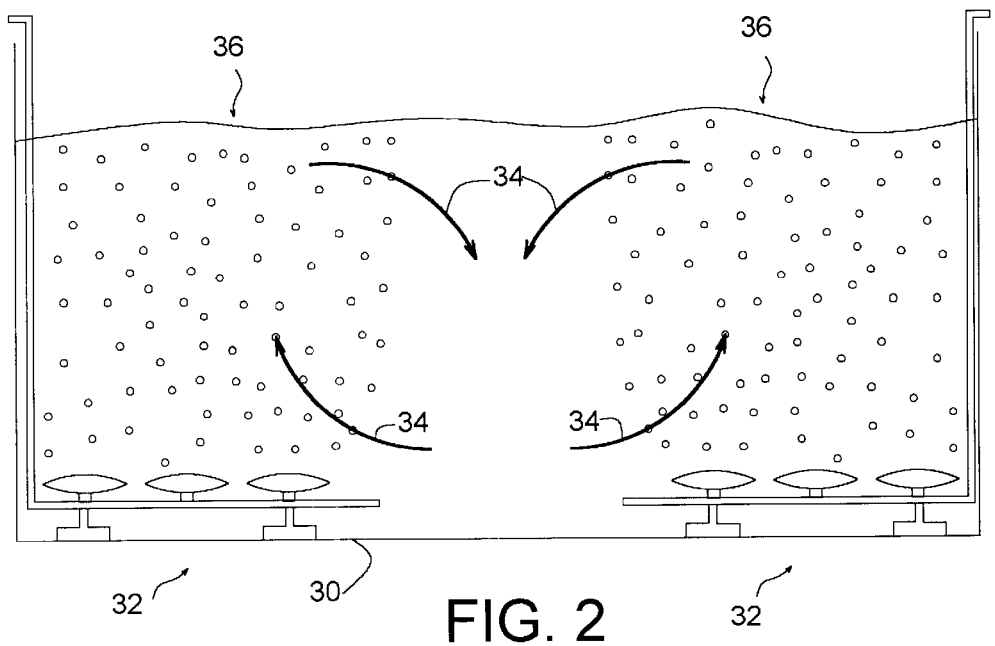
FIG. 2 is an elevational view of a prior art aeration system having bottom support members in use in a reactor tank.

Curves C and D denote the efficiencies of systems located in large vertical walled tanks similar to that shown in FIG. 2. In the system of curve C, fine-bubble diffusers, similar to those of the present invention, were installed along two long walls of the tank as shown in FIG. 2. As a result of having areas of differing water density, liquid density induced currents such as those indicated by arrows 34 of FIG. 2 were present. The use of fine-bubble producing diffusers improve the efficiency over coarse-bubble diffusers. Curve D denotes the efficiency of an aerator system in a large vertical walled tank, such as in FIG. 2, however, the diffusers were arranged in a grid having uniform spacing so as to provide a substantially uniform density liquid throughout the tank. Such uniform density prevented liquid density induced currents from being established. The high efficiency, denoted by curve D, is attributable to 1) small bubbles having a favorable gas/liquid interface area, and 2) a long residence time due to the absence of any pronounced upward currents due to density gradients.

An aeration efficiency approaching that indicated by curve D is achievable with a large floating fine-bubble system of the invention as the conditions are similar within a large portion of the system. As discussed above, only a portion of the system of the present invention is influenced by liquid density induced currents at the periphery of the grid.

Figure 15:
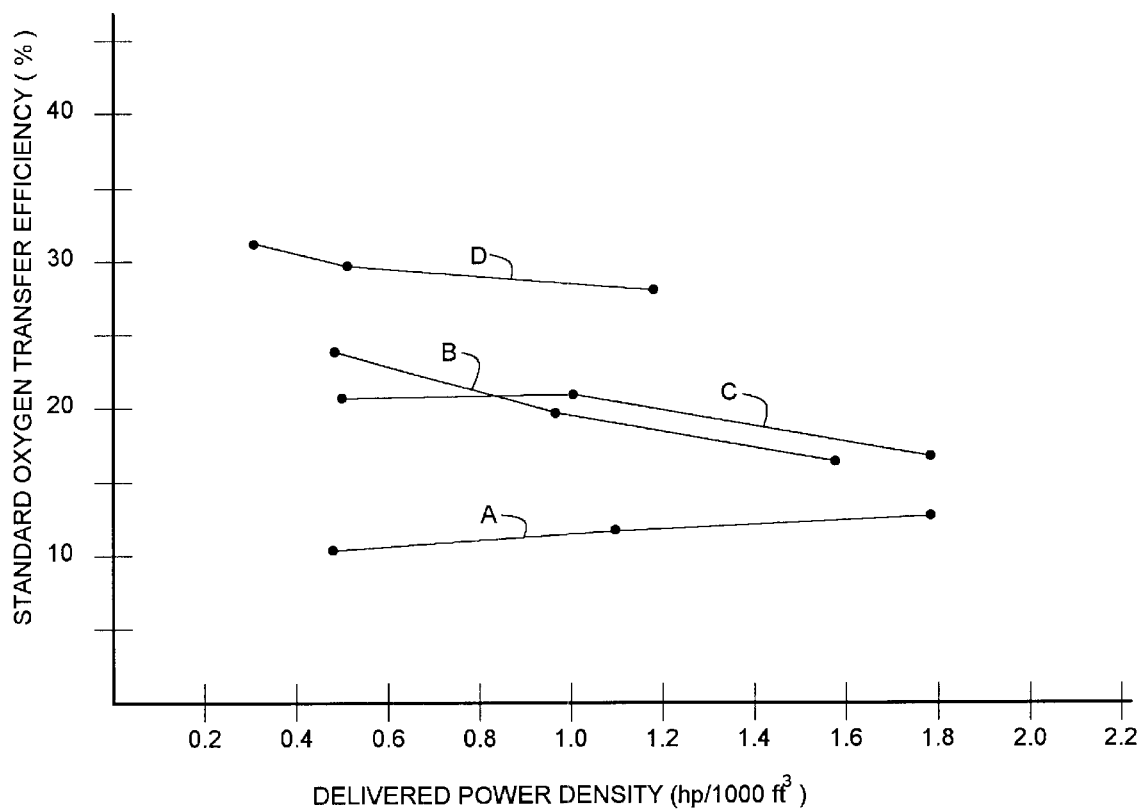
FIG. 15 is a graph showing oxygen transfer efficiency vs delivered power density for various aeration systems.

The graph of FIG. 15 expresses the efficiency of aeration systems as standard oxygen transfer efficiency express as a percent of oxygen transferred to the liquid. Conditions for curves A–D correspond to those described in relation to the graph of FIG. 14.

While specific materials, dimensions, fabricating steps, etc. have been set forth for purposes of describing embodiments of the invention, various modifications can be resorted to, in light of the above teachings, without departing from the applicant's novel contributions; therefore in determining the scope of the present invention, reference shall be made to the appended claims.

What is claimed is:

1. Apparatus for aerating liquid held in a containment structure, comprising
   a gas distribution means defining at least one input aperture and a plurality of output apertures for receiving, conveying, and outputting a supplied gas;
   a plurality of fine-bubble producing means, equal in number to the number of output apertures, in communication with the output apertures, for receiving a gas, forming fine bubbles of the gas, and discharging the fine bubbles into a liquid held in a containment structure within which said fine-bubble producing means are submerged,
   said fine-bubble producing means being configured to discharge the bubbles substantially in a plane;
   a floatation means, independent from said gas distribution means and said fine-bubble producing means, for maintaining said fine-bubble producing means substantially in a horizontal plane and submerged at a selected depth below a top surface of the held liquid when said gas distribution means and said fine-bubble producing means are placed in the held liquid, absent vertical support from the containment structure.

2. An apparatus for aerating liquid according to claim 1, further comprising
   a rigid frame attached to said gas distribution means for providing reinforcement to same, said frame having a plurality of attachment devices for communicating with said floatation means.

3. An apparatus for aerating liquid according to claim 2, wherein said floatation means includes a plurality of buoyant members, and a plurality of cables, the cables connecting the buoyant members to the attachment devices on said rigid frame.

4. An apparatus for aerating liquid according to claim 2, wherein said framework is fabricated of I-beams.

5. An apparatus for aerating liquid according to claim 1, wherein said distribution means comprises
   an elongated manifold, defining the at least one input aperture, and
   a plurality of elongated feeder conduits, each defining the output apertures, extending from the manifold and in communication with the manifold so as to convey the gas from the at least one input aperture to the plurality of the output apertures.

6. An apparatus for aerating liquid according to claim 5, wherein the manifold and the feeder conduits are fabricated of stainless steel.

7. An apparatus for aerating liquid according to claim 6, wherein the manifold and feeder conduits are fabricated of tubing having a rectangular cross section.

8. An apparatus for aerating liquid according to claim 7, wherein the manifold is fabricated of tubing having a nominal dimension of 4 inches×6 inches and the feeder conduit is fabricated of tubing having a nominal dimension of 2 inches×2 inches.

9. An apparatus for aerating liquid according to claim 7, wherein
   said fine-bubble producing means is a membrane disc diffuser,
   each said diffuser is attached to the feeder conduit by means of a threaded member protruding from the conduit, an "O" ring is provided between surfaces of the conduit and each diffuser, and the output apertures are disposed so as to output gas interior of the "O" rings.

10. An apparatus for aerating liquid according to claim 7, wherein
   the elongated feeder conduits are welded in a gas-tight manner to the elongated manifold in a direction perpendicular to the elongated manifold, and an aperture is provided in the manifold at the location of each conduit such that gas conveyed by the manifold enters the conduit via the aperture.

11. An apparatus for aerating liquid according to claim 1, wherein said fine-bubble producing means are selected from: membrane disc diffusers and membrane tube diffusers.

12. An apparatus for aerating liquid according to claim 1, wherein said fine-bubble producing means are arranged in a two dimensional orthogonal coordinate grid having a uniform spacing along an x axis, and a uniform spacing along a y axis.

13. An apparatus for aerating liquid according to claim 12, wherein the grid is divided into a plurality of uniformly shaped spacing areas, each spacing area incorporates one diffuser, and sides and ends of each spacing area have dimensions with a ratio of between 1:1 and 4:1.

14. An apparatus for aerating liquid according to claim 13, wherein the maximum dimension of a spacing area side is 60 inches.

15. An apparatus for aerating liquid according to claim 12, wherein said fine-bubble producing means are arranged so as to provide a substantially uniform dispersement of bubbles in the liquid as measured in a horizontal plane location at a distance of about 3 feet from said plane of bubble discharge.

16. An apparatus for aerating liquid according to claim 12, wherein said fine-bubble producing means are arranged with a spacing such that substantially no density induced currents are present in the liquid at locations interior of a periphery of said grid.

17. An apparatus for aerating liquid according to claim 16, wherein said grid is of a size such that at least 25% of the fine bubbles which are discharged float to the top surface substantially free of influence from density induced currents.

18. An apparatus for aerating liquid according to claim 16, wherein the grid has dimensions of at least 12 feet by 12 feet.

19. An apparatus for aerating liquid according to claim 1, wherein said fine-bubble producing means discharge bubbles having diameters between 1 mm and 10 mm.

20. Apparatus for aerating liquid held in a containment structure, comprising
   an elongated manifold, defining at least one input aperture;
   a plurality of elongated feeder conduits, in communication with said manifold, each defining a plurality of output apertures
   a plurality of fine-bubble producing membrane diffusers, equal in number to the number of output apertures, in communication with said output apertures, for receiving a gas, forming fine bubbles of the gas, and discharging the fine bubbles into a liquid held in a containment structure within which said diffusers are submerged,
   a rigid frame attached beneath said manifold and feeder conduits for providing support to same,
   a plurality of buoyant members and cables for maintaining said fine-bubble diffusers at a selected depth below the top surface of said liquid,
   said fine-bubble diffusers being arranged uniformly spaced in a two dimensional grid, each within a uniformly shaped spacing area,
   each said spacing area having a side and an end with dimensions such that the ratio of side to end is between 1:1 and 1:4, each said side having a maximum dimension of 60 inches, and said grid having a dimension of at least 12'×12'.

21. A method for aerating liquid held in a containment structure, comprising
   providing a liquid to be aerated which is held in a containment structure;
   floating an aerating apparatus in the liquid for use in introducing a gas into the liquid, said aerating apparatus having a plurality of separate diffusers disposed over a selected horizontally oriented area;
   compressing the gas to be introduced and supplying it to the aerating apparatus;
   introducing the gas over the selected horizontally oriented area at a selected depth below the surface of the liquid as fine bubbles in a manner such that bubble density above the area of introduction is substantially uniform, and said fine bubbles introduced at areas other than near peripheral edges of said selected area have a residence time in the liquid which is determined primarily by buoyancy of the bubbles without influence from liquid density induced currents.

22. A method for aerating liquid according to claim 21, wherein said bubbles are generated with use of a membrane diffuser.

23. A method for aerating liquid according to claim 21 wherein said bubbles are of a diameter between 1 mm and 10 mm.

24. A method for aerating liquid held in a containment structure, comprising
   providing a liquid to be aerated which is held in a containment structure;
   floating an aerating apparatus in the liquid for use in introducing a gas into the liquid;
   compressing the gas to be introduced and supplying it to the aerating apparatus;
   introducing the gas over a horizontally oriented area at a selected depth below the surface of the liquid as fine bubbles in a manner such that bubble density above the area of introduction is substantially uniform, wherein said bubbles are generated with use of a membrane diffuser, and
   said membrane diffusers are positioned in a two-dimensional uniformly spaced grid over the area of introduction.

25. A method for aerating liquid according to claim 24, wherein said grid of uniformly spaced diffusers is at least 12'×12'.

26. A method for aerating liquid according to claim 24 wherein said grid is of a size such that at least 25% of the fine bubbles are free of influence from density induced currents.

27. A method for aerating liquid held in a containment structure, comprising
   providing a liquid to be aerated which is held in a containment structure;
   floating an aerating apparatus in the liquid for use in introducing a gas into the liquid;
   compressing the gas to be introduced and supplying it to the aerating apparatus;
   introducing the gas over a horizontally oriented area at a selected depth below the surface of the liquid as fine bubbles in a manner such that bubble density above the area of introduction is substantially uniform, wherein said bubbles are generated with use of a membrane diffuser,
   said area of bubble introduction is divided into a plurality of uniformly shaped spacing areas,
   each spacing area incorporates one diffuser, and
   sides and ends of each spacing area have dimensions with a ratio of between 1:1 and 4:1.

28. A method for aerating liquid according to claim 27, wherein the maximum dimension of a spacing area side is 60 inches.

* * * * *